US011486460B2

(12) United States Patent
DeSalvo et al.

(10) Patent No.: US 11,486,460 B2
(45) Date of Patent: Nov. 1, 2022

(54) WORK VEHICLE WITH TUNED MASS DAMPERS

(71) Applicant: Deere & Company, Moline, IL (US)

(72) Inventors: Anthony T. DeSalvo, Cedar Falls, IA (US); Michael B. Gill, Waterloo, IA (US); Aaron Booms, Waterloo, IA (US); William H. Kirkpatrick, Waterloo, IA (US); Patrick Murphy, Livonia, MI (US); Patrick Bagby, Livonia, MI (US); Aaron Lock, Livonia, MI (US)

(73) Assignee: DEERE & COMPANY, Moline, IL (US)

( * ) Notice: Subject to any disclaimer, the term of this patent is extended or adjusted under 35 U.S.C. 154(b) by 227 days.

(21) Appl. No.: 16/552,719

(22) Filed: Aug. 27, 2019

(65) Prior Publication Data

US 2021/0062884 A1    Mar. 4, 2021

(51) Int. Cl.
*F16F 7/108* (2006.01)
*F16F 7/104* (2006.01)
*B62D 33/06* (2006.01)

(52) U.S. Cl.
CPC .......... *F16F 7/104* (2013.01); *B62D 33/0604* (2013.01); *F16F 7/108* (2013.01)

(58) Field of Classification Search
CPC .... F16F 7/10; F16F 7/108; F16F 15/02; F16F 15/022; F16F 2222/08

(Continued)

(56) References Cited

U.S. PATENT DOCUMENTS 1,819,665 A * 8/1931 Wiltse ................ F16F 7/10
 188/380
1,867,752 A * 7/1932 Paton ................. B60R 19/285
 293/104

(Continued)

FOREIGN PATENT DOCUMENTS

DE   102006028705 B3 * 9/2007 .............. F16F 7/108
DE   102015214456 A1    2/2017
JP      201736032 A    2/2017

OTHER PUBLICATIONS

Machine translation of DE 102006028705, retrieved Jul. 30, 2021 (Year: 2021).*

(Continued)

*Primary Examiner* — Bradley T King
(74) *Attorney, Agent, or Firm* — Michael Best & Friedrich LLP (57) ABSTRACT

A work vehicle includes a frame, an axle, a cab supported by the frame, a first tuned mass damper assembly, and a second tuned mass damper assembly. The frame includes a first longitudinal frame member and a second longitudinal frame member. The first longitudinal frame member has a first rear end, and the second longitudinal frame member has a second rear end. The second longitudinal frame member extends parallel to the first longitudinal frame member. The axle extends perpendicular to the first and second longitudinal frame members. The cab is disposed on a side of the first and second longitudinal frame members opposite the axle. The first tuned mass damper assembly is mounted on the first longitudinal frame member between the first rear end and the cab. The second tuned mass damper is mounted on the second longitudinal frame member between the second rear end and the cab.

9 Claims, 8 Drawing Sheets

(58) Field of Classification Search
USPC .......................................................... 188/379
See application file for complete search history.

(56) References Cited

U.S. PATENT DOCUMENTS

| | | | | | |
|---|---|---|---|---|---|
| 2,199,084 | A * | 4/1940 | Schieferstein | ......... | B60G 11/22 267/257 |
| 2,271,935 | A * | 2/1942 | Buchanan | ................ | H02G 7/14 174/42 |
| 2,744,749 | A * | 5/1956 | Fiedor | ................... | B60G 13/16 267/253 |
| 2,797,931 | A * | 7/1957 | Hans | ...................... | B62D 37/04 280/758 |
| 3,447,638 | A * | 6/1969 | Schilberg | ................... | F16F 7/10 188/379 |
| 3,668,939 | A * | 6/1972 | Schrader | ................... | B06B 3/00 74/61 |
| 4,440,375 | A * | 4/1984 | Fukushima | ............. | F16F 7/108 248/559 |
| 4,458,862 | A * | 7/1984 | Mouille | ................ | B64C 27/001 188/379 |
| 4,815,556 | A * | 3/1989 | Sumimoto | ............... | B60G 3/22 180/311 |
| 5,005,864 | A * | 4/1991 | Chachere | ............... | B62D 21/12 280/785 |
| 5,687,948 | A * | 11/1997 | Whiteford | ............. | F16F 1/3814 248/635 |
| 5,887,843 | A * | 3/1999 | Hidekawa | ............... | B60G 7/00 248/559 |
| 5,984,233 | A * | 11/1999 | Snyder, Jr. | ............... | F16F 7/108 188/379 |
| 6,065,742 | A * | 5/2000 | Whiteford | ............... | F16F 7/108 188/378 |
| 6,099,039 | A * | 8/2000 | Hine | .................... | B60G 11/181 180/311 |
| 6,189,955 | B1 | 2/2001 | Fryk et al. | | |
| 6,364,078 | B1 * | 4/2002 | Parison | ................... | B60G 3/01 188/380 |
| 6,450,473 | B1 * | 9/2002 | Kondo | ................... | F16F 1/373 248/560 |
| 6,529,345 | B1 | 3/2003 | Butler et al. | | |
| 6,736,423 | B2 | 5/2004 | Simonian et al. | | |
| 7,032,723 | B2 | 4/2006 | Quaglia et al. | | |
| 2001/0026039 | A1 * | 10/2001 | Hasegawa | .............. | B60G 7/001 267/292 |
| 2004/0124052 | A1 * | 7/2004 | Larmande | ............... | F16F 7/108 188/379 |
| 2004/0149531 | A1 * | 8/2004 | Durre | .................... | B60G 13/16 188/379 |
| 2006/0010775 | A1 | 1/2006 | Tao et al. | | |
| 2006/0266599 | A1 | 11/2006 | Denys et al. | | |
| 2008/0023929 | A1 * | 1/2008 | Ryberg | ................... | F16F 9/306 280/124.107 |
| 2008/0136207 | A1 | 6/2008 | Aoyama et al. | | |
| 2008/0237949 | A1 * | 10/2008 | Hasegawa | ............... | F16F 7/108 267/140 |
| 2008/0252102 | A1 * | 10/2008 | Fukunaga | .......... | B62D 33/0617 296/190.08 |
| 2010/0066049 | A1 * | 3/2010 | Kobayashi | ........... | B60G 21/051 280/124.116 |
| 2010/0102095 | A1 * | 4/2010 | Houser | .................. | B60G 13/16 224/42.23 |
| 2011/0079457 | A1 | 4/2011 | Virtanen et al. | | |
| 2016/0033003 | A1 | 2/2016 | Siemens et al. | | |
| 2016/0131220 | A1 | 5/2016 | Siemens et al. | | |
| 2016/0375741 | A1 | 12/2016 | Thompson et al. | | |
| 2017/0167560 | A1 * | 6/2017 | Kim | ...................... | B60G 15/04 |
| 2019/0003547 | A1 * | 1/2019 | Hill | ...................... | F16F 7/1005 |
| 2019/0277364 | A1 * | 9/2019 | Lammi | ................. | B64C 11/008 |
| 2021/0025469 | A1 * | 1/2021 | Mendoza | ................ | F16F 7/108 |

OTHER PUBLICATIONS

German Search Report issued in application No. DE102020209451. 9, dated Nov. 3, 2021, 8 pages.

* cited by examiner

WORK VEHICLE WITH TUNED MASS DAMPERS

BACKGROUND

The present disclosure relates to a work vehicle including vibration mitigation components.

SUMMARY

Many work vehicles seek to avoid vibration transfer to the cab. Such work vehicles often include the cab supported by one or more springs to mitigate vibration transfer. Even these work vehicles, however, can experience vibrations at resonant vibration frequencies for certain work vehicle speeds. These vibrations can cause a significant amount of noise. What is needed, therefore, is a work vehicle including one or more components to more effectively mitigate vibrations, especially vibrations at resonant vibration frequencies.

In one aspect, the disclosure provides a work vehicle including a frame, an axle, a cab supported by the frame, a first tuned mass damper assembly, and a second tuned mass damper assembly. The frame includes a first longitudinal frame member and a second longitudinal frame member. The first longitudinal frame member has a first rear end, and the second longitudinal frame member has a second rear end. The second longitudinal frame member extends parallel to the first longitudinal frame member. The axle extends perpendicular to the first and second longitudinal frame members. The cab is disposed on a side of the first and second longitudinal frame members opposite the axle. The first tuned mass damper assembly is mounted on the first longitudinal frame member between the first rear end and the cab. The second tuned mass damper is mounted on the second longitudinal frame member between the second rear end and the cab.

In another aspect, the disclosure provides a work vehicle including a frame, an axle, and a tuned mass damper assembly. The frame includes a longitudinal frame member. The axle extends perpendicular to the longitudinal frame member. The tuned mass damper assembly is mounted on the longitudinal frame member on a side opposite the axle. The tuned mass damper assembly includes a mounting plate, a rear weight, and a rear resilient layer. The mounting plate includes a frame end and a weight end opposite the frame end. The frame end is coupled to the longitudinal frame member. The rear weight is disposed on a rear side of the mounting plate. The rear resilient layer is disposed between the mounting plate and the rear weight.

In yet another aspect, the disclosure provides a tuned mass damper assembly for use with a work vehicle. The tuned mass damper assembly includes a mounting plate, a pair of weights, a pair of resilient layers, a fastener, and a spacer. The mounting plate includes a frame end configured to be coupled to the work vehicle and a weight end opposite the frame end and angled relative to the frame end. The pair of weights are coupled to each other and disposed on opposite sides of the mounting plate. The pair of weights are disposed on the mounting plate nearer the weight end of the mounting plate than the frame end of the mounting plate. Each of the pair of resilient layers is disposed between the mounting plate and a corresponding weight of the pair of weights. The fastener couples the pair of weights to each other. The fastener also extends through the mounting plate and through the pair of resilient layers. The spacer at least partially surrounds the fastener. The spacer is disposed longitudinally between the pair of weights. The spacer is also disposed laterally between the fastener and the mounting plate and between the fastener and each resilient layer.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
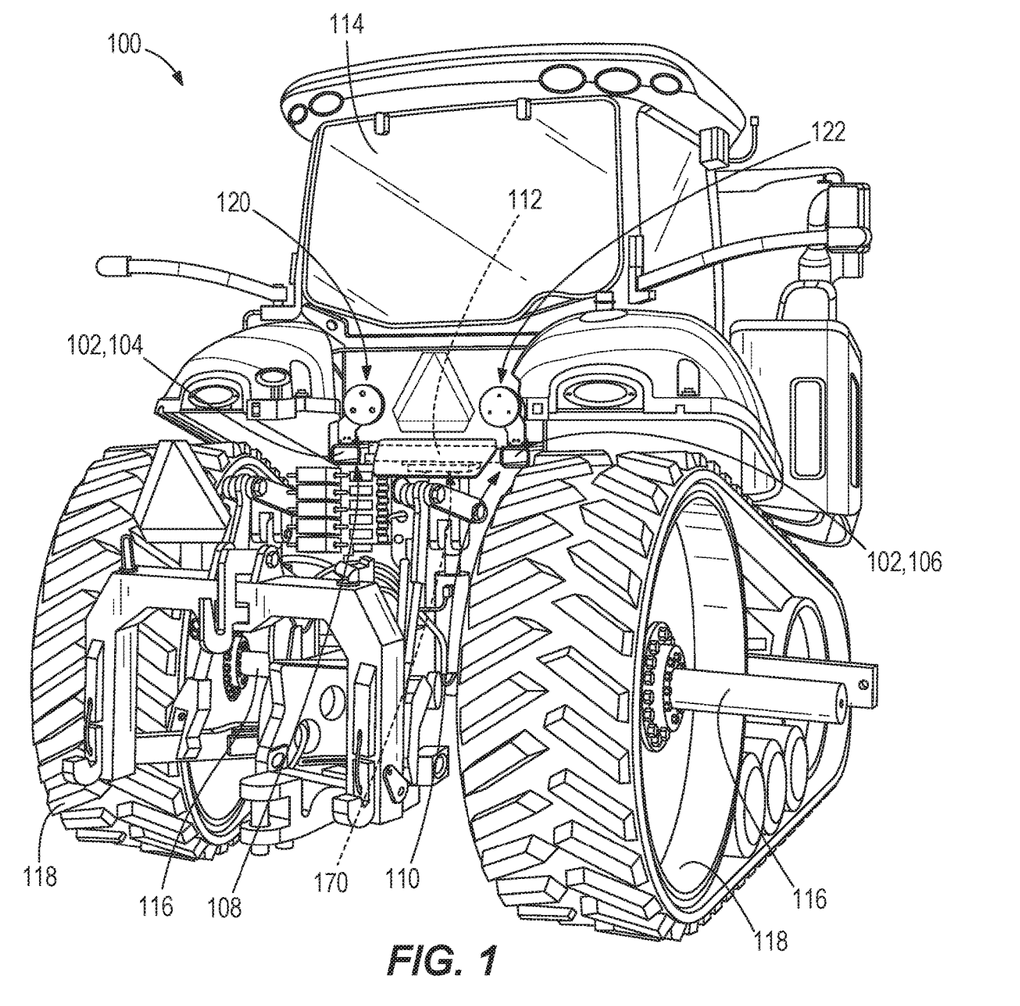
FIG. 1 is a rear perspective view of a work vehicle according to an embodiment of the disclosure.

FIG. 1 illustrates a work vehicle 100. The work vehicle 100 can be subject to vibrations while driving that can become loud to an operator, especially when the vibrations occur at resonant frequencies of the components of the work vehicle 100. It has been discovered that these vibrations at resonant frequencies occur especially while driving the work vehicle 100 at transport speeds (e.g., road speeds for transporting the work vehicle 100 to or from a work location).

The work vehicle 100 includes a frame 102. The frame 102 includes a first longitudinal frame member 104 and a second longitudinal frame member 106. The first and second longitudinal frame members 104, 106 extend parallel to each other and parallel to the forward direction of travel of the work vehicle 100. The first longitudinal frame member 104 includes a first rear end 108. The second longitudinal frame member 106 includes a second rear end 110. The first rear end 108 and the second rear end 110 are the rearmost portions of the first and second longitudinal frame members 104, 106 relative to the direction of travel of the work vehicle 100. The frame 102 further includes a cross-member 112. The cross-member 112 is connected to both the first longitudinal frame member 104 and the second longitudinal frame member 106. The cross-member 112 extends perpendicular to the first and second longitudinal frame members 104, 106.

The frame 102 supports a cab 114 of the work vehicle 100 in which an operator sits. The cab 114 is disposed above the first and second longitudinal frame members 104, 106. The frame 102 is also rotatably connected to an axle 116 having ground engagement members 118 (e.g., wheels, sprockets and tracks, or the like) coupled thereto. The axle 116 extends perpendicular to the first and second longitudinal frame members 104, 106 and is disposed below the first and second longitudinal frame members 104, 106.

The work vehicle 100 is illustrated with a central plane CP bisecting the work vehicle 100. The central plane CP extends parallel to the forward direction of travel of the work vehicle 100. In the illustrated embodiment, the central plane CP extends parallel to the first and second longitudinal frame members 104, 106 and perpendicular to the cross-member 112 and the axle 116.

Figure 2:
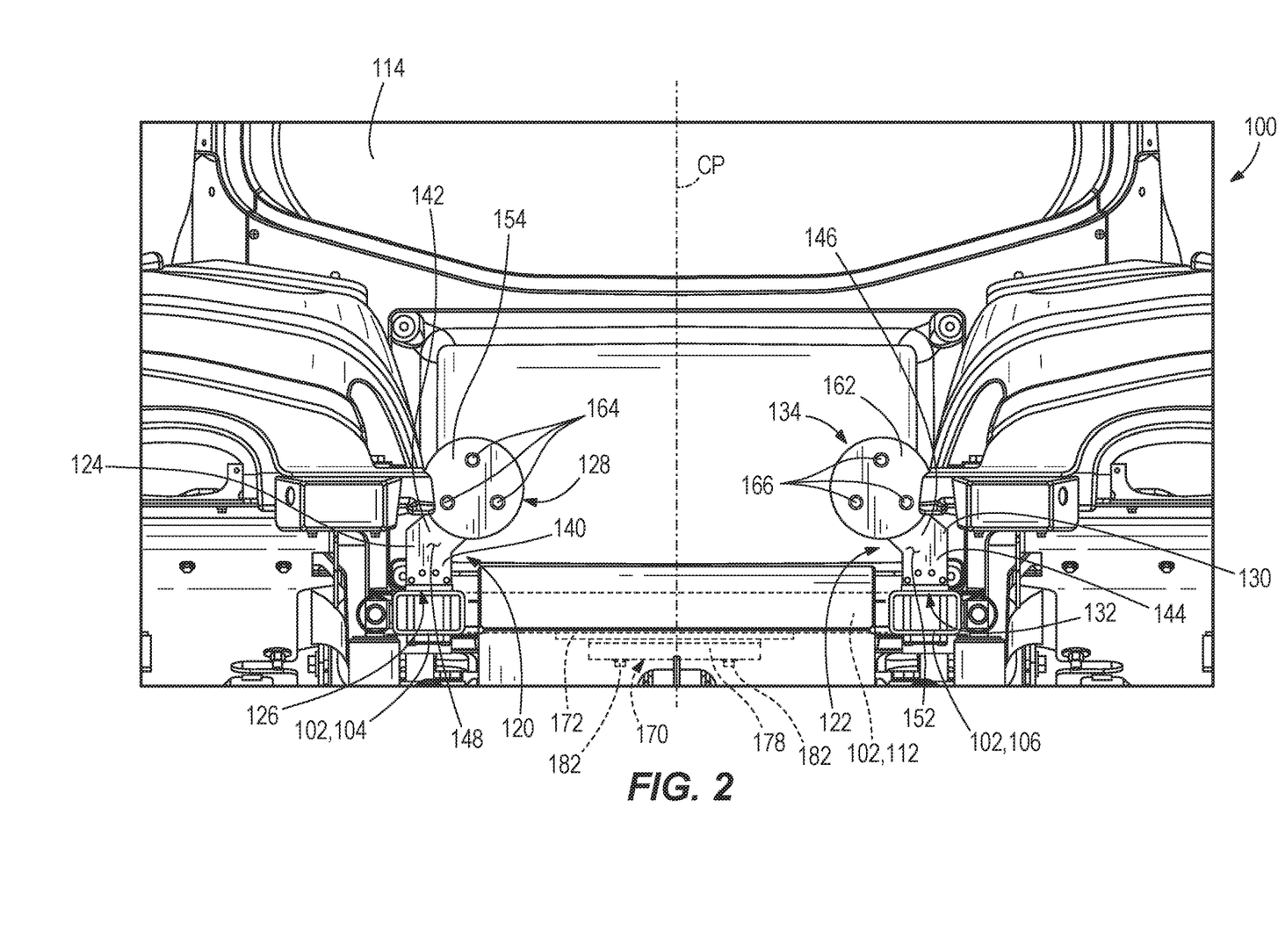
FIG. 2 is a detailed rear elevation view of the work vehicle of FIG. 1.

The work vehicle 100 also includes a first tuned mass damper assembly 120 and a second tuned mass damper assembly 122. As shown in FIGS. 1 and 2, the first tuned mass damper assembly 120 is mounted on the first longitudinal frame member 104, and the second tuned mass damper assembly 122 is mounted on the second longitudinal frame member 106. In the illustrated embodiment, the first tuned mass damper assembly 120 is mounted between the first rear end 108 of the first longitudinal frame member 104 and the cab 114. Also in the illustrated embodiment, the second tuned mass damper assembly 122 is mounted between the second rear end 110 of the second longitudinal frame member 106 and the cab 114. As such, the first tuned mass damper assembly 120 and the second tuned mass damper assembly 122 are positioned behind the cab 114 along the forward direction of travel of the work vehicle 100.

In the illustrated embodiment, the first tuned mass damper assembly 120 is mounted on a top surface of the first longitudinal frame member 104, and the second tuned mass damper assembly 122 is mounted on a top surface of the second longitudinal frame member 106. As such, the first and second tuned mass damper assemblies 120, 122 are positioned on a side of the first and second frame members 104, 106 that is opposite the axle 116.

As shown in FIG. 2, the first tuned mass damper assembly 120 includes a first mounting plate 124 having a first frame end 126 and a first weight end 128. The first frame end 126 is coupled to the first longitudinal frame member 104, and the first weight end 128 is opposite the first frame end 126 such that the first weight end 128 is nearer the central plane CP than the first frame end 126. Also shown in FIG. 2, the second tuned mass damper assembly 122 includes a second mounting plate 130 having a second frame end 132 and a second weight end 134. The second frame end 132 is coupled to the second longitudinal frame member 106, and the second weight end 134 is opposite the second frame end 132 such that the second weight end 134 is nearer the central plane CP than the second frame end 132. As such, the work vehicle 100 includes first and second tuned mass damper assemblies 120, 122 that angle toward each other.

Because the illustrated embodiment includes first and second tuned mass damper assemblies 120, 122 that are identical except for being mirrored in arrangement, only the first tuned mass damper assembly 120 is shown in FIGS. 3-6.

Figure 3:
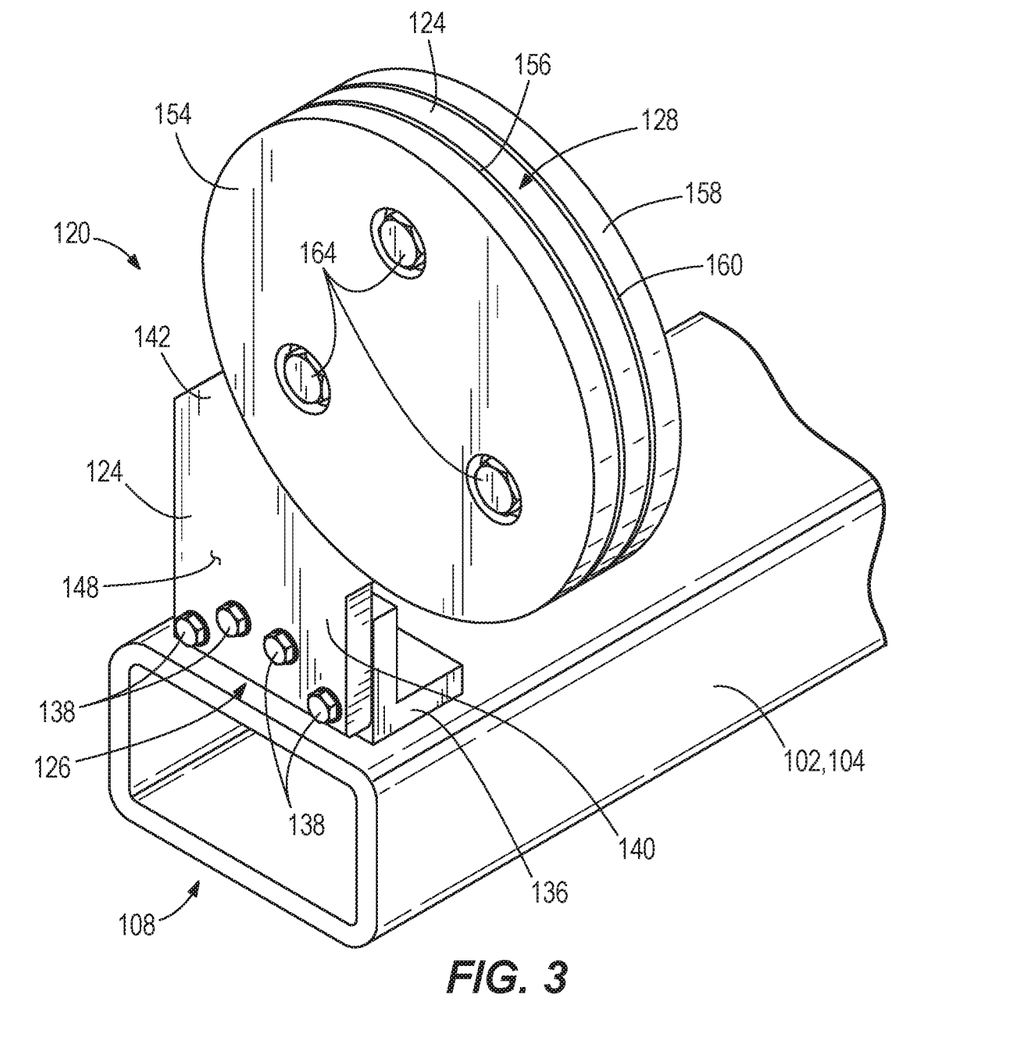
FIG. 3 is a perspective view of a tuned mass damper assembly of the work vehicle of FIG. 1.

With reference to FIG. 3, the first tuned mass damper assembly 120 is shown mounted to the first longitudinal frame member 104 adjacent the first rear end 108 of the first longitudinal frame member 104. In the illustrated embodiment, the second tuned mass damper assembly 120 is also mounted to the second longitudinal frame member 106 adjacent the second rear end 110 of the second longitudinal frame member 106. In the illustrated embodiment, each of the first tuned mass damper assembly 120 and the second tuned mass damper assembly 122 includes an L-bracket 136 connecting the mounting plate 124, 130 to the longitudinal frame member 104, 106 via, for instance, mounting fasteners 138.

Figure 4:
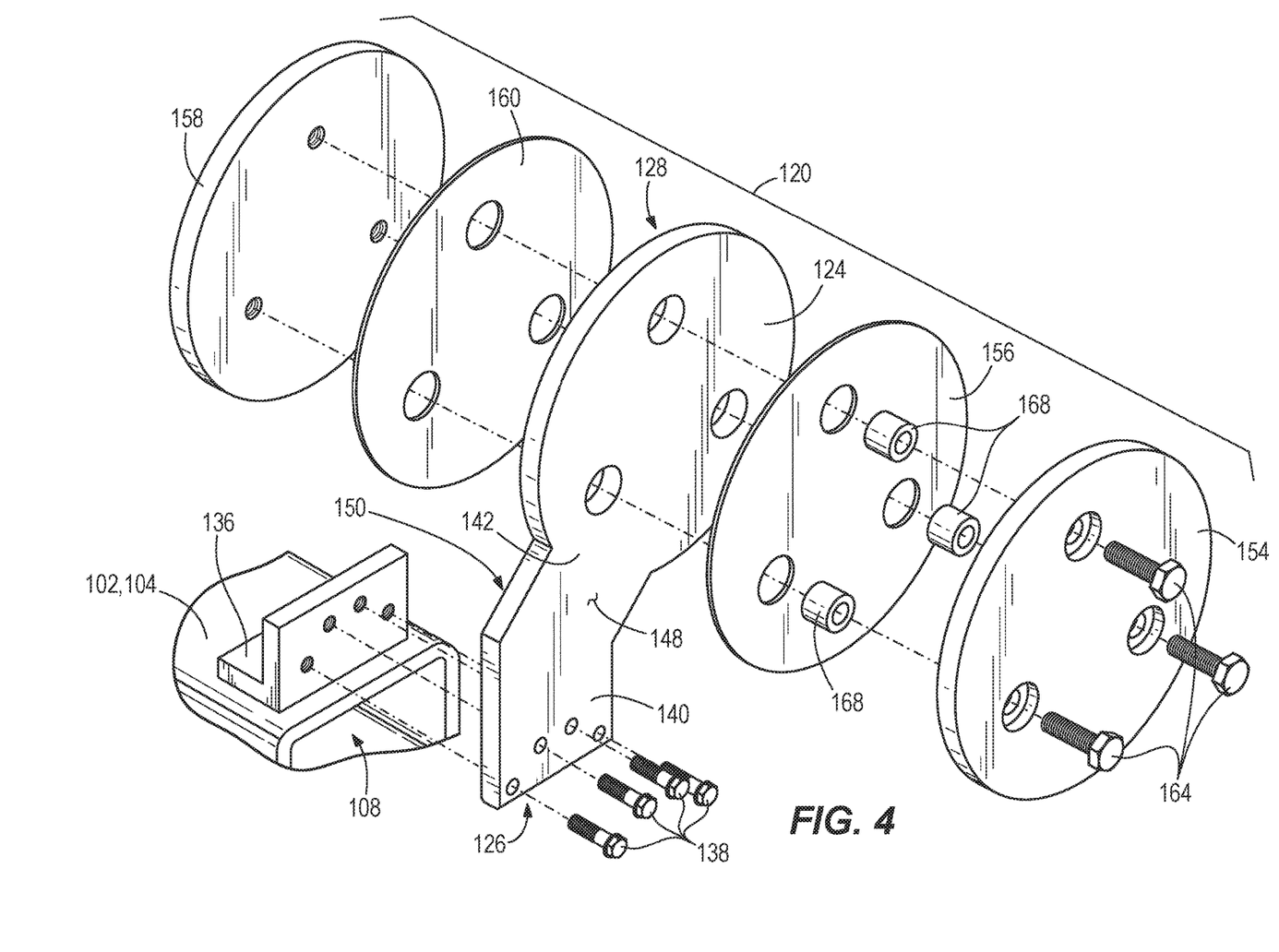
FIG. 4 is an exploded perspective view of the tuned mass damper assembly of FIG. 3.

As shown in FIGS. 3 and 4, the first tuned mass damper assembly 120 includes the first mounting plate 124, which has the first frame end 126 and the first weight end 128. The first weight end 128 of the first mounting plate 124 is circular in cross-section. Likewise, the second weight end 134 of the second mounting plate 130 is circular in cross-section.

Also shown in FIGS. 3 and 4, the first mounting plate 124 includes a first vertical portion 140 and a first angled portion 142. The first vertical portion 140 extends upwardly from the first frame end 126 of the first mounting plate 124. The first angled portion 142 extends toward the central plane CP from the first vertical portion 140 and terminates at the first weight end 128. With reference to FIG. 2, the second mounting plate 130 also includes a second vertical portion 144 and a second angled portion 146. These angled mounting plates 124, 130 position the tuned mass damper assemblies 120, 122 away from other components of the work vehicle 100 including, for instance, fuel tanks.

With reference to FIGS. 3 and 4, the first mounting plate 124 further includes a first rear side 148 and a first front side 150 that is opposite the first rear side 148. The second mounting plate 130 likewise includes a second rear side 152 and a second front side, but only the second rear side 152 is shown in FIG. 2.

The first tuned mass damper assembly 120 also includes a first rear weight 154 disposed on the first rear side 148 of the first mounting plate 124 with a first rear resilient layer 156 disposed between the first mounting plate 124 and the first rear weight 154. In the illustrated embodiment, the first tuned mass damper assembly 120 further includes a first front weight 158 disposed on the first front side 150 of the first mounting plate 124 with a first front resilient layer 160 disposed between the first mounting plate 124 and the first front weight 158. Only the second rear weight 162 of the second tuned mass damper assembly 122 is shown in FIG. 2, although the arrangement of the second tuned mass damper assembly 122 is substantially identical to the first tuned mass damper assembly 120.

As shown in FIG. 4, the first tuned mass damper assembly 120 further includes a plurality of first fasteners 164 connecting the first front weight 158 to the first rear weight 154. In the illustrated embodiment, the first fasteners 164 are threadingly engaged with only the first front weight 158. The second tuned mass damper assembly 122 likewise includes a plurality of second fasteners 166 connecting the second front weight to the second rear weight 162 (FIG. 2).

In the illustrated embodiment, the first tuned mass damper assembly 120 also includes a plurality of first spacers 168. Each of the first fasteners 164 passes through a corresponding first spacer 168. The first spacers 168 prevent a user from tightening the first fasteners 164 too much, which ensures the first rear resilient layer 156 and the first front resilient layer 160 are able to be compressed further during motion of the first rear weight 154 and the first front weight 158. The first rear weight 154 and the first front weight 158 are able to move together, but also independently of the first mounting plate 124 in a plurality of directions. The second tuned mass damper assembly 122 similarly includes a plurality of second spacers such that the second rear weight 162 and the second front weight are able to move independently of the second mounting plate 130 in a plurality of directions.

Figure 5:
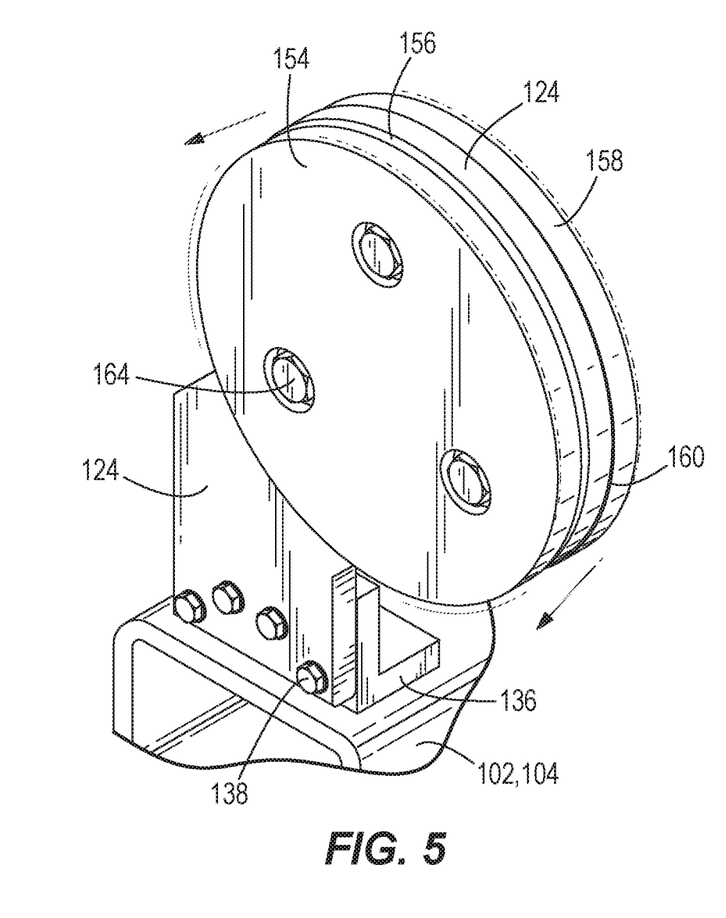
FIG. 5 is a perspective view of the tuned mass damper assembly of FIG. 3 moving in a first direction due to vibrations.
Figure 6:
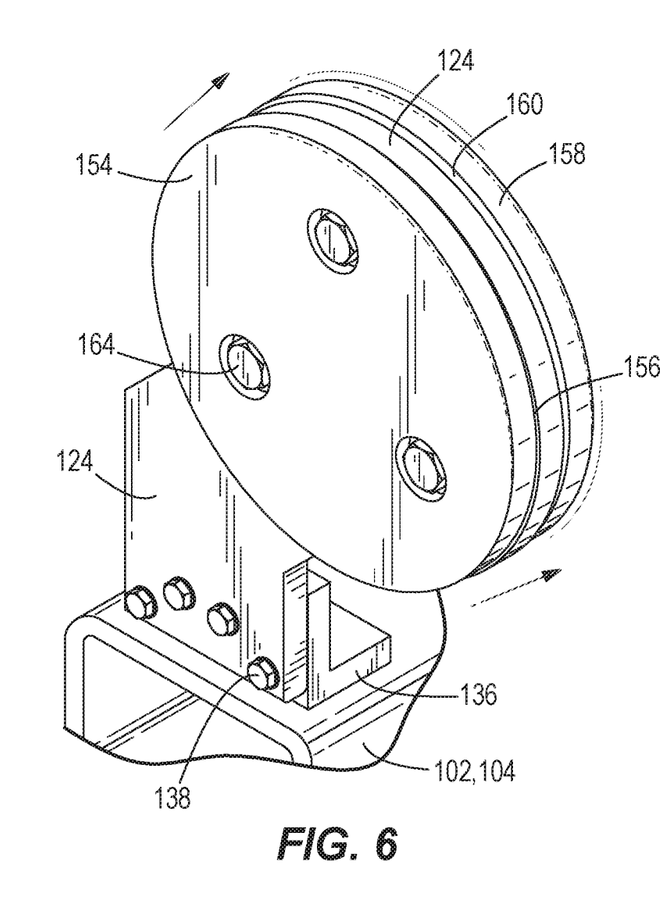
FIG. 6 is a perspective view of the tuned mass damper assembly of FIG. 3 moving in a second direction due to vibrations.

As shown in FIGS. 5 and 6, the first rear weight 154 and the first front weight 158 move together relative to the first mounting plate 124. As shown in FIG. 5, for example, when an impulse on the frame 102 causes the first longitudinal frame member 104 and the rigidly attached first mounting plate 124 to move forward, the first rear weight 154 and the first front weight 158 at least momentarily remain in place. This motion causes the first front weight 158 to compress the first front resilient layer 160, thereby damping at least some of the vibration forces. As shown in FIG. 6, when an impulse on the frame 102 causes the first longitudinal frame member 104 and the rigidly attached first mounting plate 124 to move rearward, the first rear weight 154 and the first front weight 158 again at least momentarily remain in place. This motion causes the first rear weight 154 to compress the first rear resilient layer 156, thereby damping at least some of the vibration forces. Other impulse directions are contemplated herein, and those discussed above are only two examples. In some embodiments, a clearance between each of the first spacers 168 and the first mounting plate 124, a clearance between each of the first spacers 168 and the first rear resilient layer 156, and a clearance between each of the first spacers 168 and the first front resilient layer 160 allow the first rear weight 154 and the first front weight 158 to move laterally with respect to the frame 102 and the first mounting plate 124.

In the illustrated embodiment, each of the first rear weight 154, the first front weight 158, the second rear weight 162, and the second front weight are circular in cross-section. As such, the orientation of the weights is less critical for the tuned mass damper assemblies 120, 122 due to the radial symmetry of the weights. The tolerance for the torque in installing the fasteners 164, 166, for instance, is larger for this arrangement than with weights that are not circular in cross-section. The weights 158, 162 cannot be misaligned relative to each other due to the radial symmetry.

Figure 7:
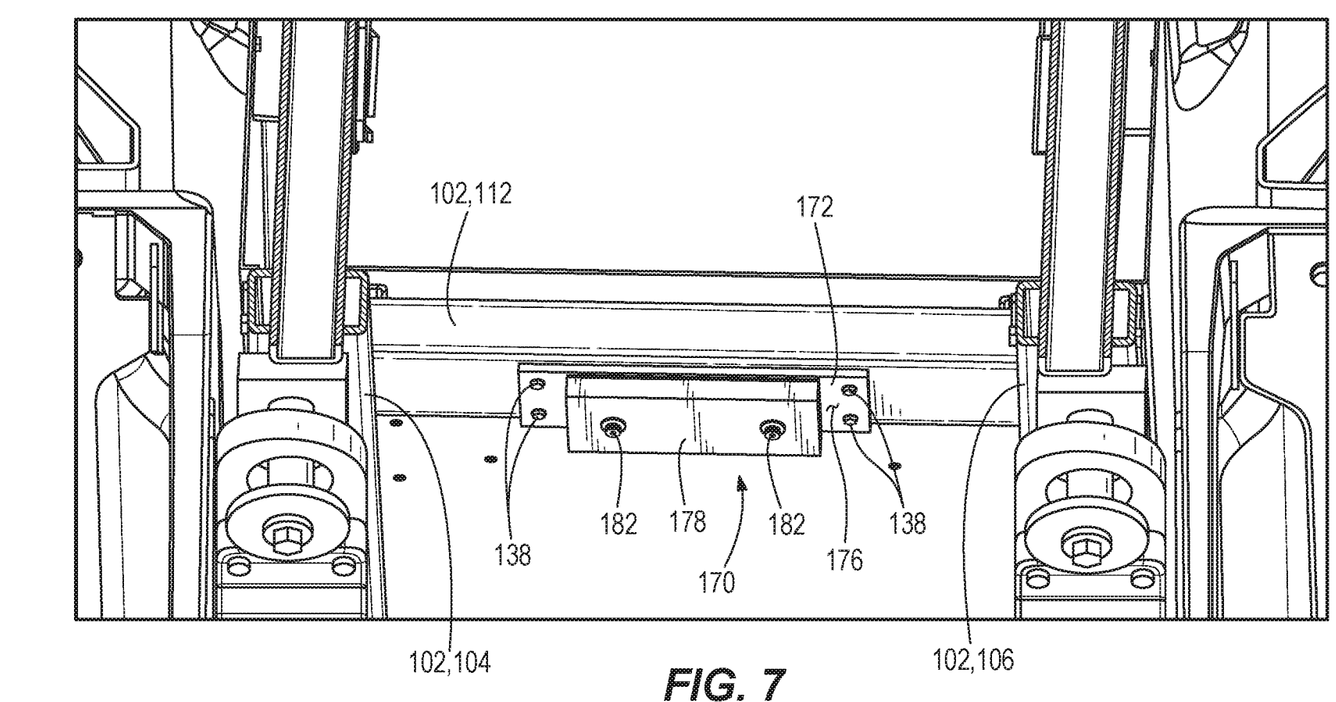
FIG. 7 is a bottom rear perspective cross-sectional view of a portion of the work vehicle of FIG. 1 showing a tuned mass damper assembly.

With reference to FIGS. 2 and 7, the work vehicle 100 further includes a third tuned mass damper assembly 170 mounted to the cross-member 112 of the frame 102. In the illustrated embodiment, the third tuned mass damper assembly 170 is mounted on a bottom side of the cross-member 112, such that the third tuned mass damper assembly 170 is on the same side of the cross-member 112 as the axle 116. In the illustrated embodiment, the third tuned mass damper assembly 170 is mounted centrally on the cross-member 112, such that the third tuned mass damper assembly 170 is disposed on both sides of the central plane CP.

Figure 8:
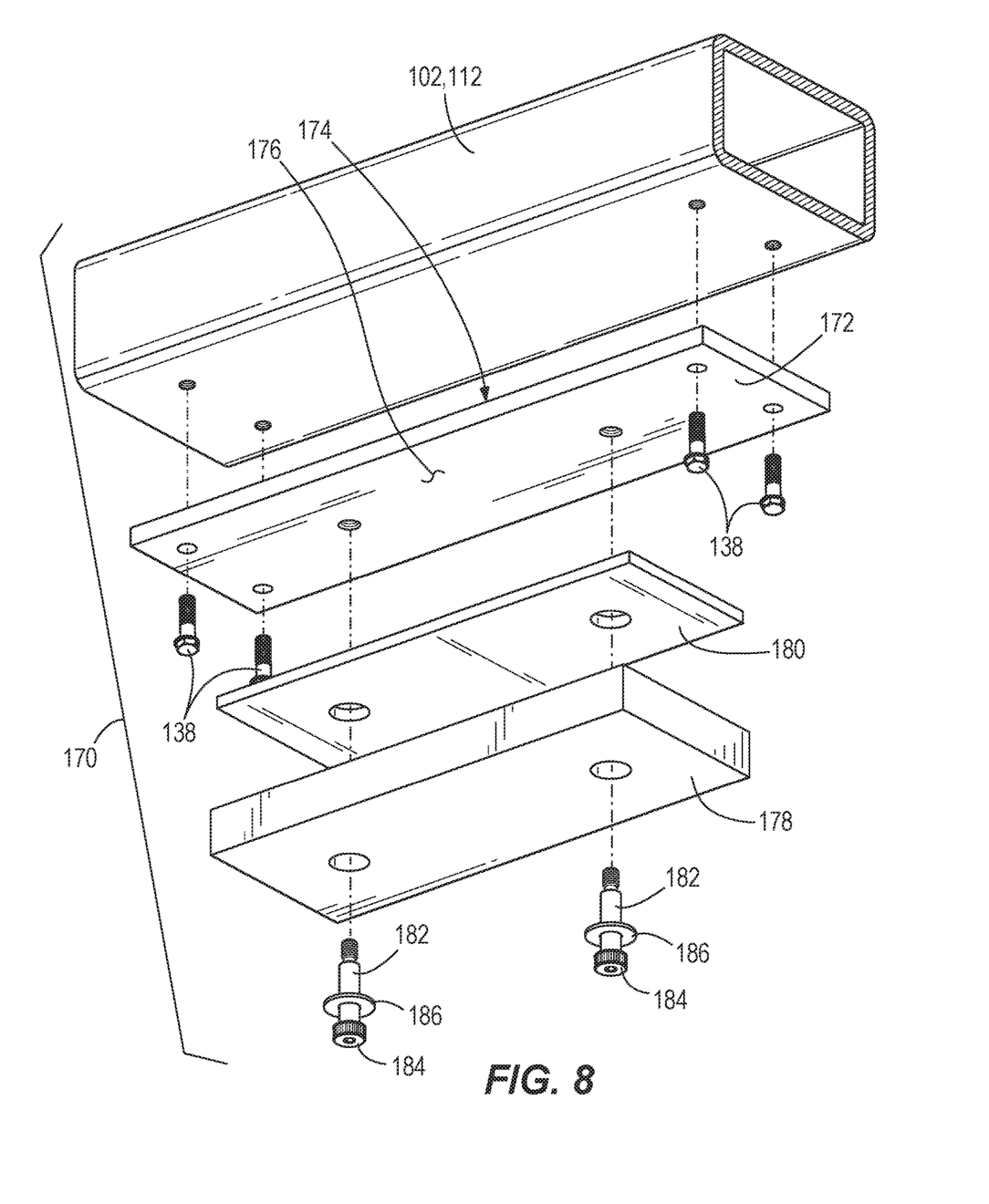
FIG. 8 is an exploded perspective view of the tuned mass damper assembly of FIG. 7.

As shown in FIG. 8, the third tuned mass damper assembly 170 includes a third mounting plate 172 having a frame side 174 and a weight side 176. The weight side 176 is positioned opposite the frame side 174. A third weight 178 is disposed on the weight side 176 of the third mounting plate 172, and a third resilient layer 180 is disposed between the third weight 178 and the third mounting plate 172. In some embodiments, the third resilient layer 180 is coupled to the third weight 178 and the third mounting plate 172 with an adhesive.

The third tuned mass damper assembly 170 further includes a plurality of third fasteners 182 threadingly engaged with the third mounting plate 172 but not the third weight 178 or the third resilient layer 180. The head 184 of each third fastener 182 and/or a washer 186 disposed on each third fastener 182 is positioned a distance away from the third weight 178. The head 184 and/or washer 186 of each third fastener 182 is configured only to catch the third weight 178 should the adhesive coupling the third weight 178 to the third resilient layer 180 or the adhesive coupling the third resilient layer 180 to the third mounting plate 172 fail. In this arrangement, the third weight 178 is able to move independently of the third mounting plate 172 in a plurality of directions.

Figure 9:
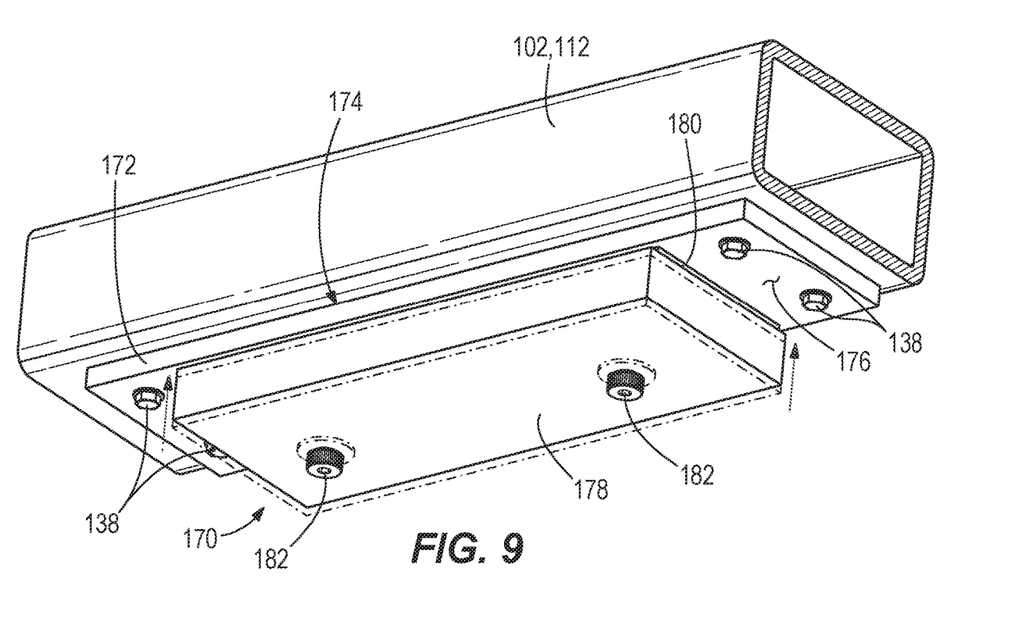
FIG. 9 is a perspective view of the tuned mass damper assembly of FIG. 7 moving in a first direction due to vibrations.
Figure 10:
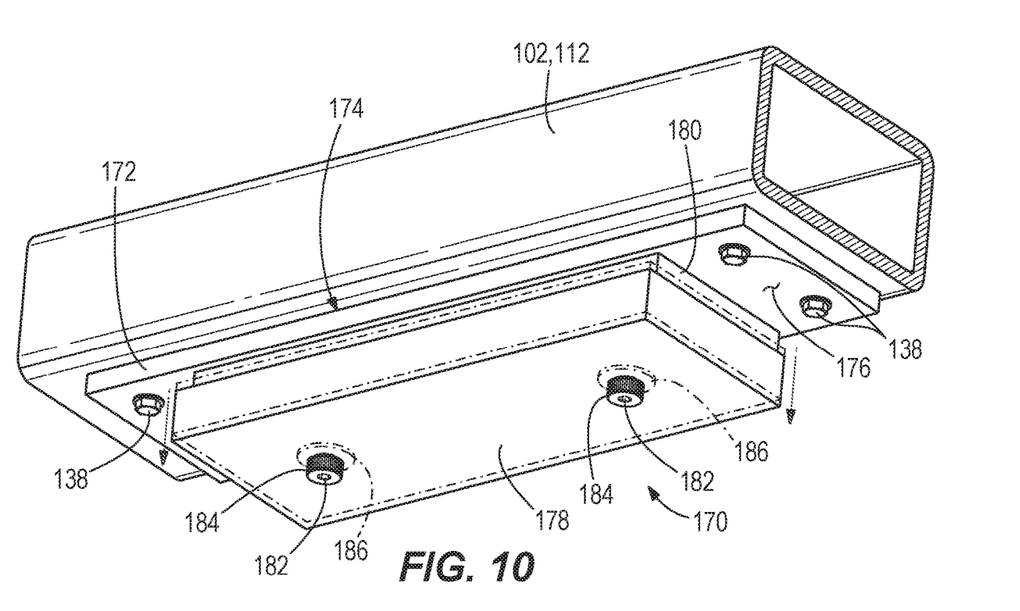
FIG. 10 is a perspective view of the tuned mass damper assembly of FIG. 7 moving in a second direction due to vibrations.

As shown in FIG. 9, for example, when an impulse on the frame 102 causes the cross-member 112 and the rigidly attached third mounting plate 172 to move downward, the third weight 178 at least momentarily remains in place. This motion causes the third weight 178 to compress the third resilient layer 180, thereby damping at least some of the vibration forces. As shown in FIG. 10, when an impulse on the frame 102 causes the cross-member 112 and the rigidly attached third mounting plate 172 to move upward, the third weight 178 at least momentarily remains in place. This motion causes the third weight 178 to stretch the third resilient layer 180 due to the third resilient layer 180 being affixed via adhesive to both the third weight 178 and the third mounting plate 172, thereby damping at least some of the vibration forces. In some embodiments, a clearance between each of the third fasteners 182 and the third weight 178 and a clearance between each of the third fasteners 182 and the third resilient layer 180 allow the third weight 178 to move laterally with respect to the frame 102, the third mounting plate 172, and the third fasteners 182.

For the tuned mass damper assemblies 120, 122, 170 disclosed herein to operate to the greatest effect, the mass of each weight and the hardness of each resilient layer must be "tuned" to the specifications required for the particular work vehicle 100.

In some embodiments, each of the first tuned mass damper assembly 120 and the second tuned mass damper assembly 122 (without the L-bracket 136) weighs between 6 and 10 kilograms. In other embodiments, each of the first tuned mass damper assembly 120 and the second tuned mass damper assembly 122 (without the L-bracket 136) weighs between 7 and 9 kilograms. In still other embodiments, each of the first tuned mass damper assembly 120 and the second tuned mass damper assembly 122 (without the L-bracket 136) weighs between 7 and 8 kilograms. In yet other embodiments, each of the first tuned mass damper assembly 120 and the second tuned mass damper assembly 122 (without the L-bracket 136) weighs 7.922 kilograms. In some embodiments, the third tuned mass damper assembly 170 weighs between 6 and 10 kilograms. In other embodiments, the third tuned mass damper assembly 170 weighs between 7 and 9 kilograms. In still other embodiments, the third tuned mass damper assembly 170 weighs between 8 and 9 kilograms. In yet other embodiments, the third tuned mass damper assembly 170 weighs 8.219 kilograms. In some embodiments, each of the first front weight 158, the first rear weight 154, the second front weight, and the second rear weight 162 is between 0.5 and 4.5 kilograms. In other embodiments, each of the first front weight 158, the first rear weight 154, the second front weight, and the second rear weight 162 is between 1.5 and 3.5 kilograms. In still other embodiments, each of the first front weight 158, the first rear weight 154, the second front weight, and the second rear weight 162 is approximately 2.25 kilograms. In some embodiments, the third weight 178 is between 3 and 7 kilograms. In other embodiments, the third weight 178 is between 4 and 6 kilograms. In still other embodiments, the third weight 178 is approximately 5.09 kilograms.

In some embodiments, each of the first rear resilient layer 156, the first front resilient layer 160, the second rear resilient layer, and the second front resilient layer has a hardness of 60 on the durometer scale. In some embodiments, the third resilient layer 180 has a hardness of 45 on the durometer scale. Other hardness values on the durometer scale are also contemplated herein. The resilient layers disclosed herein may be made of rubber, for instance.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. A work vehicle comprising:
   a frame including
      a first longitudinal frame member; and
      a second longitudinal frame member extending parallel to the first longitudinal frame member;
   an axle extending perpendicular to the first longitudinal frame member;
   a first tuned mass damper assembly mounted on the first longitudinal frame member on a side opposite the axle, the first tuned mass damper assembly including
      a first mounting plate including a first frame end and a first weight end opposite the first frame end, the first frame end coupled to the first longitudinal frame member;
      a first front weight disposed on a first front side of the first mounting plate;
      a first front resilient layer disposed between the first mounting plate and the first front weight;
      a first rear weight disposed on a first rear side of the first mounting plate opposite the first front side of the first mounting plate;
      a first rear resilient layer disposed between the first mounting plate and the first rear weight and
      a plurality of first fasteners connecting the first front weight to the first rear weight and
   a second tuned mass damper assembly mounted on the second longitudinal frame member on a side opposite the axle, the second tuned mass damper assembly including
      a second mounting plate including a second frame end and a second weight end opposite the second frame end, the second frame end coupled to the second longitudinal frame member;
      a second front weight disposed on a second front side of the second mounting plate;
      a second front resilient layer disposed between the second mounting plate and the second front weight;
      a second rear weight disposed on a second rear side of the second mounting plate opposite the second front side of the second mounting plate;
      a second rear resilient layer disposed between the second mounting plate and the second rear weight and
      a plurality of second fasteners connecting the second front weight to the second rear weight.

2. The work vehicle of claim 1, wherein
   the first tuned mass damper assembly further includes a plurality of first spacers, each of the first spacers being disposed between a corresponding first fastener and the first mounting plate, between the corresponding first fastener and the first front resilient layer, and between the corresponding first fastener and the first rear resilient layer; and
   the second tuned mass damper assembly further includes a plurality of second spacers, each of the second spacers being disposed between a corresponding second fastener and the second mounting plate, between the corresponding second fastener and the second front resilient layer, and between the corresponding second fastener and the fourth second rear resilient layer.

3. The work vehicle of claim 1, wherein
   the first front weight, the first rear weight, the second front weight, and the second rear weight are each circular in cross-section.

4. The work vehicle of claim 1, wherein
   the first front weight, the first rear weight, the second front weight, and the second rear weight are each between 1.5 and 3.5 kilograms.

5. The work vehicle of claim 1, further comprising
   a third tuned mass damper assembly including
      a third mounting plate having a frame side and a weight side opposite the frame side;
      a third weight disposed on the weight side; and
      a third resilient layer disposed between the third weight and the weight side; and wherein
   the frame further includes a cross-member connected to both the first longitudinal frame member and the second longitudinal frame member; and
   the third tuned mass damper assembly is mounted on the cross-member.

6. The work vehicle of claim 5, wherein
   the third resilient layer is affixed to the third weight and the third mounting plate with adhesive.

7. The work vehicle of claim 5, wherein
   the third weight is between 4 and 6 kilograms.

8. A work vehicle comprising:
   a frame including
      a first longitudinal frame member; and
      a second longitudinal frame member extending parallel to the first longitudinal frame member;
   an axle extending perpendicular to the first longitudinal frame member;
   a first tuned mass damper assembly mounted on the first longitudinal frame member on a side opposite the axle, the first tuned mass damper assembly including
      a first mounting plate including
         a first frame end coupled to the first longitudinal frame member of the work vehicle; and
         a first weight end opposite the first frame end and angled relative to the first frame end, the first weight end being a first free end of the first mounting plate that is distal from the work vehicle;
      a pair of first weights coupled to each other and disposed on opposite sides of the first mounting plate nearer the first weight end of the first mounting plate than the first frame end of the first mounting plate;
      a pair of first resilient layers, each first resilient layer disposed between the first mounting plate and a corresponding first weight of the pair of first weights;
      a first fastener coupling the pair of first weights to each other, the first fastener extending through the first mounting plate and through the pair of first resilient layers; and
      a first spacer at least partially surrounding the first fastener, the first spacer disposed longitudinally between the pair of first weights, the first spacer disposed laterally between the first fastener and the first mounting plate and between the first fastener and each first resilient layer; and a second tuned mass damper assembly mounted to the second longitudinal frame member on a side opposite the axle, the second tuned mass damper assembly including a second mounting plate including a second frame end coupled to the second longitudinal frame member of the work vehicle; and a second weight end opposite the second frame end and angled relative to the second frame end, the second weight end being a second free end of the second mounting plate that is distal from the work vehicle;

a pair of second weights coupled to each other and disposed on opposite sides of the second mounting plate nearer the second weight end of the second mounting plate than the second frame end of the second mounting plate;

a pair of second resilient layers, each second resilient layer disposed between the second mounting plate and a corresponding second weight of the pair of second weights;

a second fastener coupling the pair of second weights to each other, the second fastener extending through the second mounting plate and through the pair of second resilient layers; and a second spacer at least partially surrounding the second fastener, the second spacer disposed longitudinally between the pair of second weights, the second spacer disposed laterally between the second fastener and the second mounting plate and between the second fastener and each second resilient layer.

9. The tuned mass damper assembly of claim 8, wherein
the pair of first weights, the first fastener, and the first spacer move rigidly together as a single unit relative to the first mounting plate; and
the pair of second weights, the second fastener, and the second spacer move rigidly together as a single unit relative to the second mounting plate.

* * * * *

UNITED STATES PATENT AND TRADEMARK OFFICE
CERTIFICATE OF CORRECTION

PATENT NO. : 11,486,460 B2
APPLICATION NO. : 16/552719
DATED : November 1, 2022
INVENTOR(S) : Anthony T. DeSalvo et al.

It is certified that error appears in the above-identified patent and that said Letters Patent is hereby corrected as shown below:

In the Claims

On Column 7, Claim 1, Line 40, replace "the first rear weight and" with --the first rear weight; and--

On Column 7, Claim 1, Line 42, replace "the first rear weight and" with --the first rear weight; and--

On Column 7, Claim 1, Line 59, replace "the second rear weight and" with --the second rear weight; and--

On Column 8, Claim 2, Line 10, replace "fastener and the fourth second rear resilient layer" with --fastener and the second rear resilient layer.--

Signed and Sealed this
Ninth Day of April, 2024

Katherine Kelly Vidal
*Director of the United States Patent and Trademark Office*